US012741247B2

(12) United States Patent
Liao et al.

(10) Patent No.: US 12,741,247 B2
(45) Date of Patent: Sep. 22, 2026

(54) METHOD FOR EXTRACTING CARBON DIOXIDE FROM FLUE GAS

(71) Applicant: NAN YA PLASTICS CORPORATION, Taipei (TW)

(72) Inventors: Te-Chao Liao, Taipei (TW); Jung-Jen Chuang, Taipei (TW); Yi-Cheng Li, Taipei (TW); Fang-Ling Hsu, New Taipei City (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 450 days.

(21) Appl. No.: 18/502,102

(22) Filed: Nov. 6, 2023

(65) Prior Publication Data

US 2025/0065263 A1 Feb. 27, 2025

(30) Foreign Application Priority Data

Aug. 24, 2023 (TW) ................................. 112131781

(51) Int. Cl.
*B01D 53/62* (2006.01)
*B01D 53/40* (2006.01)
*B01D 53/75* (2006.01)

(52) U.S. Cl.
CPC ............. *B01D 53/62* (2013.01); *B01D 53/40* (2013.01); *B01D 53/75* (2013.01); *B01D 2257/504* (2013.01); *B01D 2258/0283* (2013.01)

(58) Field of Classification Search
None
See application file for complete search history.

(56) References Cited

U.S. PATENT DOCUMENTS 5,925,326 A * 7/1999 Kapoor .............. B01D 53/8625 423/220
2008/0206120 A1 8/2008 Grochowski

FOREIGN PATENT DOCUMENTS

| | | | |
|---|---|---|---|
| CN | 215259901 | U | 12/2021 |
| JP | 5142099 | A | 4/1976 |
| JP | 6263433 | A | 9/1994 |
| JP | 9118529 | A | 5/1997 |
| JP | 200310633 | A | 1/2003 |
| JP | 2014172000 | A | 9/2014 |
| JP | 2022179863 | A | 12/2022 |

(Continued)

*Primary Examiner* — Daniel Berns
(74) *Attorney, Agent, or Firm* — Li & Cai Intellectual Property Office

(57) ABSTRACT

A method for extracting carbon dioxide from a flue gas includes a preparing process, an acid removing process, and a purifying and liquefying process. The preparing process is implemented by collecting the flue gas generated by oxygen-enriched combustion of a glass raw material with methane from a glass furnace. The flue gas includes the carbon dioxide, nitrogen, water vapor, oxygen, fluoric acid compounds, and boric acid compounds. The acid removing process is implemented by performing a first acid removing operation. The first acid removing operation is implemented by using a sodium hydroxide aqueous solution to remove the fluoric acid compounds and the boric acid compounds in the flue gas. The purifying and liquefying process is implemented by using a purifying and liquefying unit to extract the flue gas that already undergoes the acid removing process, so as to obtain liquid carbon dioxide having a purity greater than 99%.

10 Claims, 8 Drawing Sheets

(56) References Cited

FOREIGN PATENT DOCUMENTS

| | | | |
|---|---|---|---|
| WO | WO2011101469 | A1 | 8/2011 |
| WO | WO2023047346 | A1 | 3/2023 |
| WO | WO2023099619 | A1 | 6/2023 |

* cited by examiner

METHOD FOR EXTRACTING CARBON DIOXIDE FROM FLUE GAS

CROSS-REFERENCE TO RELATED PATENT APPLICATION

This application claims the benefit of priority to Taiwan Patent Application No. 112131781, filed on Aug. 24, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for extracting carbon dioxide, and more particularly to a method for extracting carbon dioxide from a flue gas.

BACKGROUND OF THE DISCLOSURE

A glass furnace generates a flue gas having a high temperature. In a conventional method for processing the flue gas, after removing fluorine compounds by adding alkali, the flue gas is cooled down with a large amount of air to precipitate boron compounds, and then the flue gas is discharged.

However, after the conventional method for processing the flue gas is implemented, a volume ratio of carbon dioxide in the flue gas is too low (about 2% to 3%), such that the carbon dioxide can hardly be recycled and reused.

SUMMARY OF THE DISCLOSURE

In response to the above-referenced technical inadequacy, the present disclosure provides a method for extracting carbon dioxide from a flue gas, so as to effectively improve an issue of having difficulty to recycle and reuse the carbon dioxide due to a low volume ratio of the carbon dioxide in the flue gas after implementation of a conventional method for processing the flue gas.

In order to solve the above-mentioned problem, one of the technical aspects adopted by the present disclosure is to provide a method for extracting carbon dioxide from a flue gas. The method includes a preparing process, an acid removing process, and a purifying and liquefying process. The preparing process is implemented by collecting the flue gas generated by oxygen-enriched combustion of a glass raw material with methane from a glass furnace. The flue gas includes the carbon dioxide, nitrogen, water vapor, oxygen, fluoric acid compounds, and boric acid compounds. The acid removing process is implemented by performing a first acid removing operation on the flue gas. The first acid removing operation is implemented by using a sodium hydroxide aqueous solution to remove the fluoric acid compounds and the boric acid compounds in the flue gas. The purifying and liquefying process is implemented by using a purifying and liquefying unit to extract the flue gas that already undergoes the acid removing process, so as to obtain liquid carbon dioxide having a purity greater than 99%.

In one of the possible or preferred embodiments, in the preparing process, a temperature of the flue gas is within a range from 1,000° C. to 1,500° C. Based on a volume of the flue gas being 100%, a content of the carbon dioxide is within a range from 30% to 34%, a content of the nitrogen is within a range from 1% to 5%, a content of the water vapor is within a range from 58% to 62%, and a content of the oxygen is within a range from 2% to 6%.

In one of the possible or preferred embodiments, in the preparing process, a content of the fluoric acid compounds is greater than 0 mg/m$^3$ and less than 500 mg/m$^3$, and a content of the boric acid compounds is greater than 0 mg/m$^3$ and less than 15 mg/m$^3$.

In one of the possible or preferred embodiments, after the preparing process and before the acid removing process, the method further includes a cooling process implemented by cooling the flue gas with water, such that a temperature of the flue gas is reduced to between 200° C. and 400° C.

In one of the possible or preferred embodiments, in the acid removing process, a second acid removing operation is further performed on the flue gas, and the second acid removing operation is implemented by using sodium bicarbonate powders to remove the fluoric acid compounds and the boric acid compounds in the flue gas.

In one of the possible or preferred embodiments, in the acid removing process, the first acid removing operation is implemented by using the sodium hydroxide aqueous solution to remove the fluoric acid compounds and the boric acid compounds in the flue gas through a semi-dry acid removal tower, and the second acid removing operation is implemented by using the sodium bicarbonate powders to remove the fluoric acid compounds and the boric acid compounds in the flue gas through a dry acid removal unit. After the first acid removing operation, a temperature of the flue gas is reduced to between 170° C. and 200° C., and after the second acid removing operation, the temperature of the flue gas is maintained between 170° C. and 200° C.

In one of the possible or preferred embodiments, based on a volume of the flue gas being 100%, a content of the carbon dioxide is within a range from 21% to 25%, a content of the nitrogen is within a range from 1% to 3%, a content of the water vapor is within a range from 70% to 74%, and a content of the oxygen is within a range from 1% to 3%.

In one of the possible or preferred embodiments, after the acid removing process and before the purifying and liquefying process, the method further includes a removing process, and the removing process is implemented by using a bag filter to filter and remove by-products generated by the fluoric acid compounds and the boric acid compounds in the flue gas that undergo the acid removing process.

In one of the possible or preferred embodiments, before the purifying and liquefying process, the method further includes a cooling and water removing process, and the cooling and water removing process is implemented by reducing a temperature of the flue gas to between 20° C. and 40° C. and reducing a content of the water vapor in the flue gas. After the cooling and water removing process, based on a volume of the flue gas being 100%, a content of the carbon dioxide is greater than or equal to 75%, and the content of the water vapor is less than or equal to 10%.

In one of the possible or preferred embodiments, in the cooling and water removing process, water having a temperature of from 50° C. to 80° C. is used to cool down the flue gas through a heat recycling unit. After the water absorbs the heat of the flue gas, the water becomes hot water or water vapor having a temperature of from 95° C. to 16° C., the hot water or the water vapor is configured to be cooled down by an absorption refrigerating machine connected to the heat recycling unit and form into low-temperature water, and the low-temperature water is capable of reducing the temperature of the flue gas in the cooling and water removing process.

In one of the possible or preferred embodiments, after the cooling and water removing process, based on the volume of the flue gas being 100%, the content of the carbon dioxide is within a range from 78% to 82%, a content of the nitrogen is within a range from 5% to 9%, the content of the water vapor is within a range from 2% to 6%, and a content of the oxygen is within a range from 7% to 11%.

Therefore, in the method provided by the present disclosure, by virtue of "collecting the flue gas generated by oxygen-enriched combustion of a glass raw material with methane from a glass furnace," and "using a sodium hydroxide aqueous solution to remove the fluoric acid compounds and the boric acid compounds in the flue gas," the issue of having difficulty to recycle and reuse the carbon dioxide due to the low volume ratio of the carbon dioxide in the flue gas after implementation of the conventional method for processing the flue gas can be effectively improved.

In addition, in the cooling and water removing process, the hot water or the water vapor formed by absorbing the heat of the flue gas can be fed into the absorption refrigerating machine, and form into the low-temperature water. The low-temperature water can be used to further cool down the flue gas, thereby achieving a heat recycling and reusing effect.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
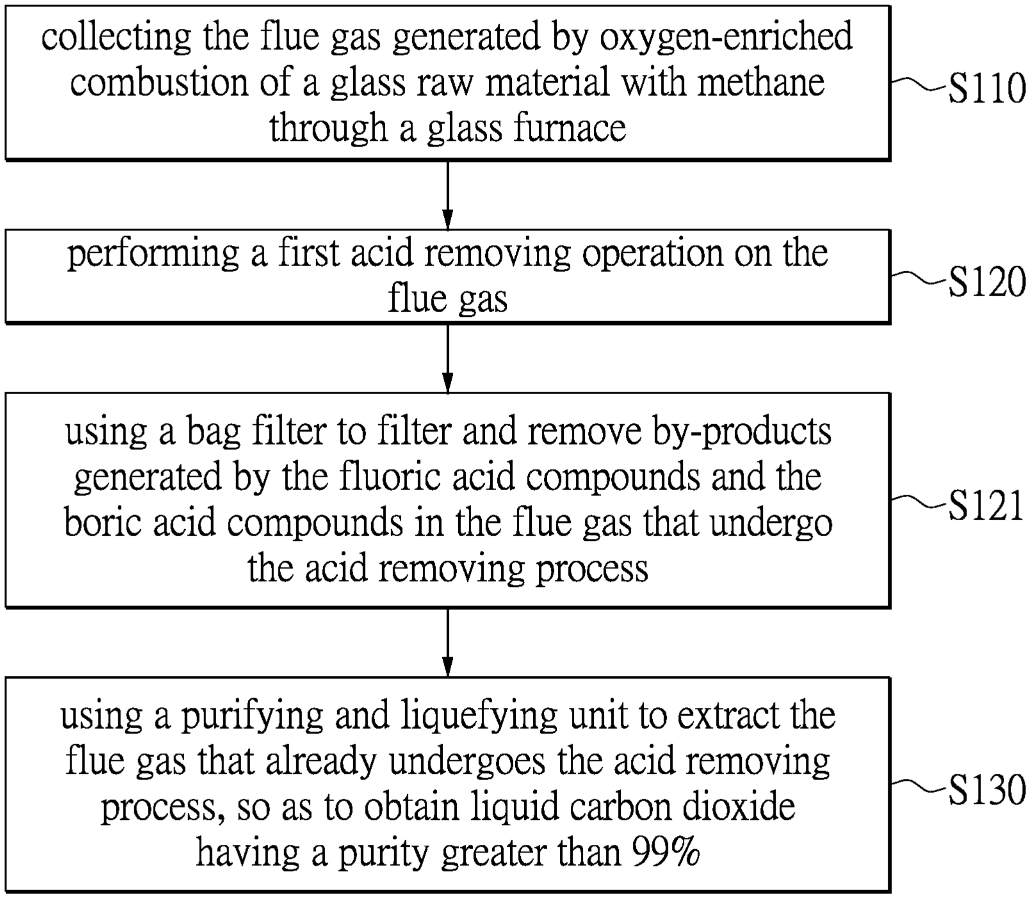
FIG. 1 is a flowchart of a method for extracting carbon dioxide from a flue gas according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
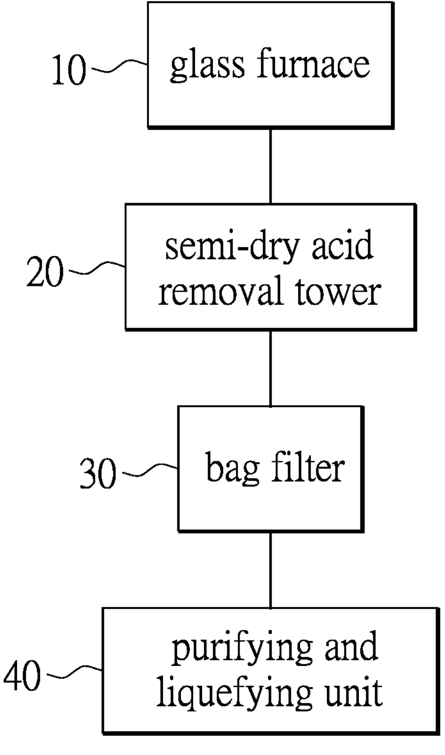
FIG. 2 is a schematic block diagram of a flue gas extracting system according to the first embodiment of the present disclosure.

Referring to FIG. 1 and FIG. 2, FIG. 1 is a flowchart of a method for extracting carbon dioxide from a flue gas according to a first embodiment of the present disclosure, and FIG. 2 is a schematic block diagram of a flue gas extracting system according to the first embodiment of the present disclosure. A first embodiment of the present disclosure provides a method for extracting carbon dioxide from a flue gas. The method includes a preparing process S110, an acid removing process S120, and a purifying and liquefying process S130.

The preparing process S110 is implemented by collecting a flue gas generated by oxygen-enriched combustion of a glass raw material with methane from a glass furnace 10. The flue gas includes carbon dioxide, nitrogen, water vapor, oxygen, fluoric acid compounds, and boric acid compounds. The fluoric acid compounds can be an acid component such as hydrofluoric acid, and the boric acid compounds can be acid components such as boric acid, oxoborinic acid, boron trioxide, or boron trifluoride. However, the present disclosure does not limit the specific materials of the fluoric acid compounds and boric acid compounds. It is worth mentioning that, the fluoric acid compounds and boric acid compounds are generated by combusting the glass raw material. Accordingly, in other technical fields, a method for extracting carbon dioxide without generating the fluoric acid compounds and the boric acid compounds is not suitable to be compared to the method of the present disclosure.

The above-mentioned "oxygen-enriched" is obtained by removing parts of nitrogen of the air, and oxygen generally accounts for more than 21% of a total gas volume. In the preparing process S110 of the present embodiment, oxygen accounts for 92% to 96%, preferably 94%, of a total volume of a gas fed into the glass furnace 10.

Compared to a flue gas generated by feeding the air into the glass furnace, carbon dioxide in the flue gas generated by oxygen-enriched combustion has a higher volume ratio, thereby increasing the possibility of carbon dioxide being recycled and reused. Specifically, the volume ratio of carbon dioxide in the flue gas generated by oxygen-enriched combustion is more than 30%, and a volume ratio of carbon dioxide in the flue gas generated by air combustion is about 12%.

In the preparing process S110 of the present embodiment, a temperature of the flue gas is within a range from 1,000° C. to 1,500° C. Based on a volume of the flue gas being 100%, a content of the carbon dioxide is within a range from 30% to 34%, a content of the nitrogen is within a range from 1% to 5%, a content of the water vapor is within a range from 58% to 62%, and a content of the oxygen is within a range from 2% to 6%.

Preferably, the temperature of the flue gas is within a range from 1,200° C. to 1,400° C. Based on the volume of the flue gas being 100%, the content of the carbon dioxide is within a range from 31% to 33%, the content of the nitrogen is within a range from 2% to 4%, the content of the water vapor is within a range from 59% to 61%, and the content of the oxygen is within a range from 2% to 6%. More preferably, the temperature of the flue gas is about 1,300° C. Based on the volume of the flue gas being 100%, the content of the carbon dioxide is about 32%, the content of the nitrogen is about 3%, the content of the water vapor is about 60%, and the content of the oxygen is about 4%.

In the preparing process S110 of the present embodiment, a content of the fluoric acid compounds is greater than 0 $mg/m^3$ and less than 500 $mg/m^3$, and a content of the boric acid compounds is greater than 0 $mg/m^3$ and less than 15 $mg/m^3$. Preferably, the content of the fluoric acid compounds is greater than 0 $mg/m^3$ and less than 400 $mg/m^3$, and the content of the boric acid compounds is greater than 0 $mg/m^3$ and less than 10 $mg/m^3$.

In the acid removing process S120, a first acid removing operation is performed on the flue gas. The first acid removing operation is implemented by using a sodium hydroxide aqueous solution to remove the fluoric acid compounds and the boric acid compounds in the flue gas. Specifically, in the acid removing process S120 of the present embodiment, the first acid removing operation is implemented by using the sodium hydroxide aqueous solution to remove the fluoric acid compounds and the boric acid compounds in the flue gas through a semi-dry acid removal tower. In addition, in the present embodiment, a weight percent concentration of the sodium hydroxide aqueous solution is within a range from 2% to 4%, but the present disclosure is not limited thereto.

After the first acid removing operation, a temperature of the flue gas is reduced to between 170° C. and 200° C., and after a second acid removing operation, the temperature of the flue gas is maintained between 170° C. and 200° C. Based on a volume of the flue gas being 100%, a content of the carbon dioxide is within a range from 21% to 25%, a content of the nitrogen is within a range from 1% to 3%, a content of the water vapor is within a range from 70% to 74%, and a content of the oxygen is within a range from 1% to 3%. Preferably, after the acid removing process S120, based on the volume of the flue gas being 100%, the content of the carbon dioxide is about 23%, the content of the nitrogen is about 2%, the content of the water vapor is about 72%, and the content of the oxygen is about 2%.

The purifying and liquefying process S130 is implemented by using a purifying and liquefying unit 40 to extract the flue gas that already undergoes the acid removing process S120, so as to obtain liquid carbon dioxide having a purity greater than 99%.

After the acid removing process S120 and before the purifying and liquefying process S130, the method further includes a removing process S121, and the removing process S121 is implemented by using a bag filter 30 to filter and remove by-products generated by the fluoric acid compounds and the boric acid compounds in the flue gas that undergo the acid removing process S120. The by-products can be alkaline solids containing fluorine or boron (e.g., sodium hydroxide or sodium bicarbonate), but the present disclosure is not limited thereto. The by-products can be recycled and reused, but the present disclosure does not limit the use of the by-products.

In addition, in the present embodiment, the method can be implemented through a flue gas extracting system 100, and the flue gas extracting system 100 includes the glass furnace 10, the semi-dry acid removal tower 20, the bag filter 30, and the purifying and liquefying unit 40.

Second Embodiment

Figure 3:
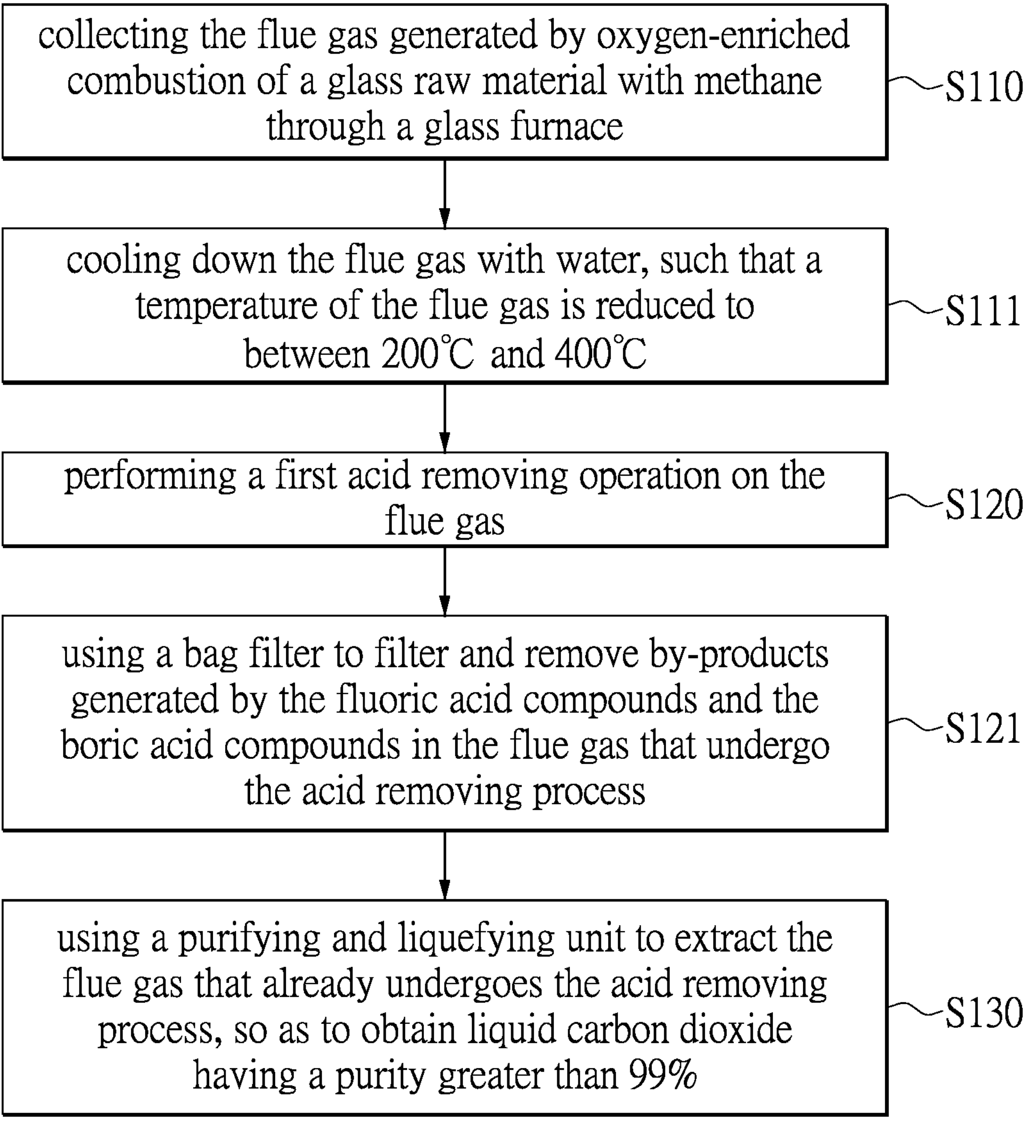
FIG. 3 is a flowchart of a method for extracting carbon dioxide from a flue gas according to a second embodiment of the present disclosure.
Figure 4:
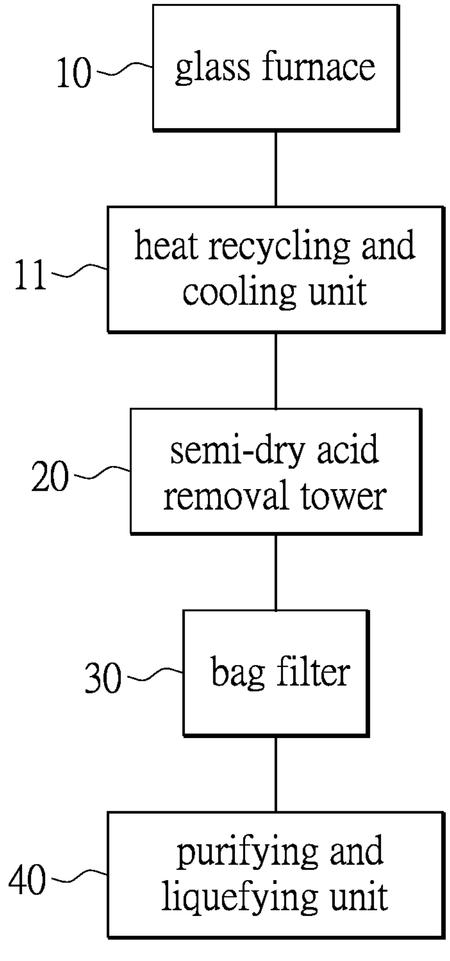
FIG. 4 is a schematic block diagram of a flue gas extracting system according to the second embodiment of the present disclosure.

Referring to FIG. 3 and FIG. 4, FIG. 3 is a flowchart of a method for extracting carbon dioxide from a flue gas according to a second embodiment of the present disclosure, and FIG. 4 is a schematic block diagram of a flue gas extracting system according to the second embodiment of the present disclosure. The present embodiment is similar to the above-mentioned first embodiment, so that the same parts of the two embodiments will not be reiterated herein, and the differences between the two embodiments are illustrated as follows.

In the present embodiment, after the preparing process S110 and before the acid removing process S120, the method further includes a cooling process S111, and the cooling process S111 is implemented by cooling down the flue gas with water, such that a temperature of the flue gas is reduced to between 200° C. and 400° C. Preferably, after the cooling process S111, the temperature of the flue gas is about 300° C. In the cooling process S111 of other embodiments, the flue gas can be cooled down by the air. Or, the flue gas can be sequentially cooled down by the air and the water, but the present disclosure is not limited thereto.

In the cooling process S111 of the present embodiment, boiler water in a heat recycling and cooling unit 11 can be used to cool down the flue gas, and the boiler water becomes water vapor after absorbing the heat of the flue gas.

Third Embodiment

Figure 5:
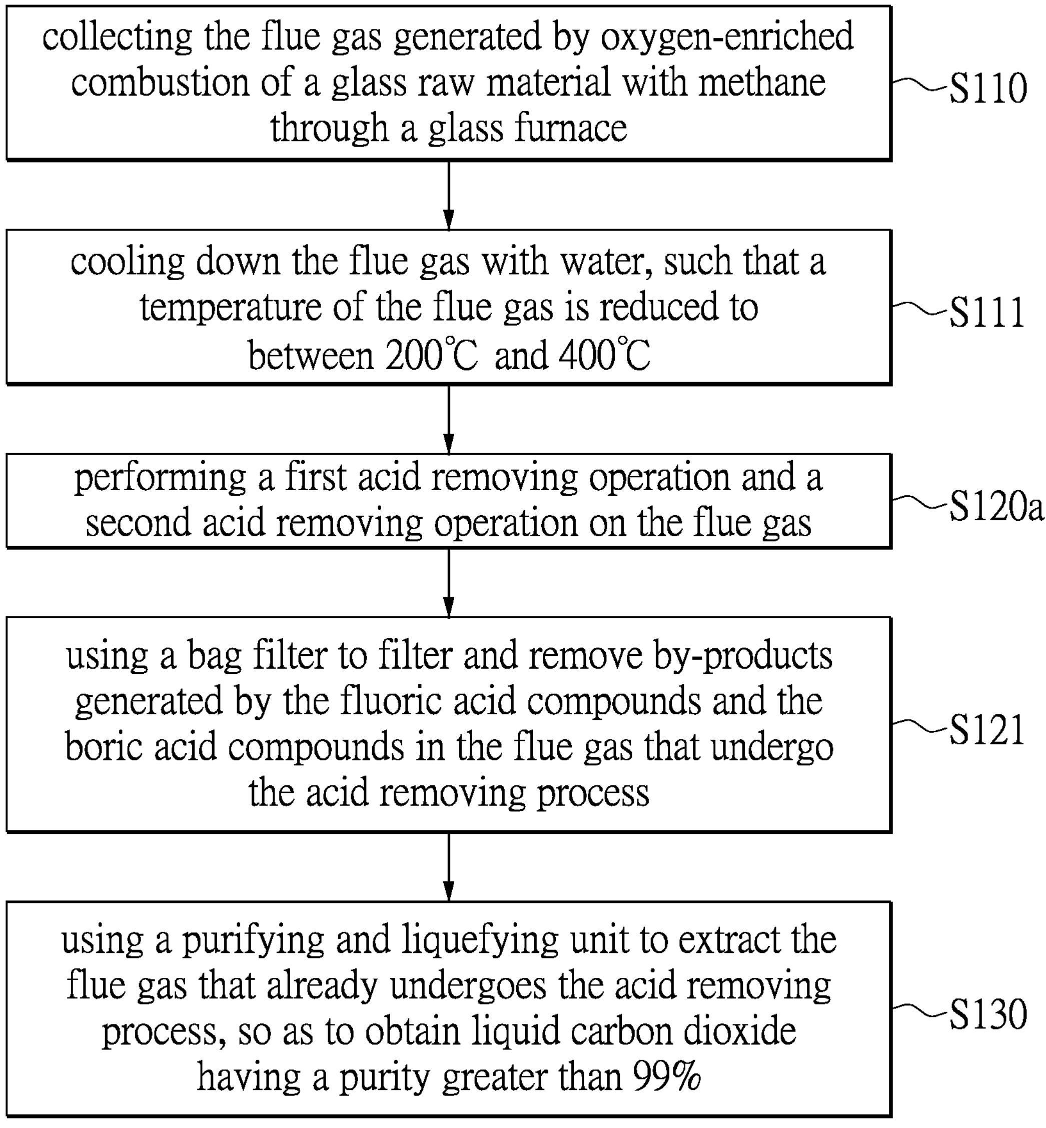
FIG. 5 is a flowchart of a method for extracting carbon dioxide from a flue gas according to a third embodiment of the present disclosure.
Figure 6:
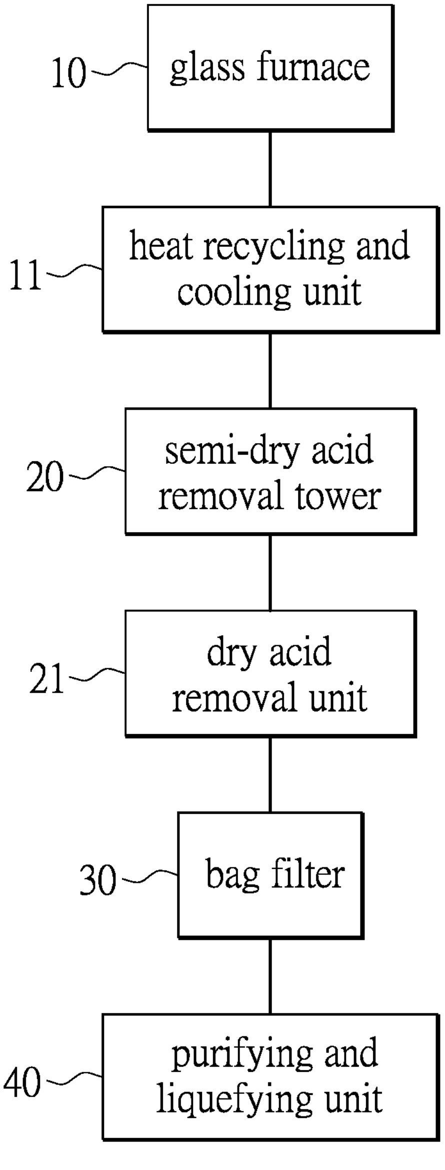
FIG. 6 is a schematic block diagram of a flue gas extracting system according to the third embodiment of the present disclosure.

Referring to FIG. 5 and FIG. 6, FIG. 5 is a flowchart of a method for extracting carbon dioxide from a flue gas according to a third embodiment of the present disclosure, and FIG. 6 is a schematic block diagram of a flue gas extracting system according to the third embodiment of the present disclosure. The present embodiment is similar to the above-mentioned second embodiment, so that the same parts of the two embodiments will not be reiterated herein, and the differences between the two embodiments are illustrated as follows.

In an acid removing process S120*a*, a second acid removing operation is further performed on the flue gas, and the second acid removing operation is implemented by using sodium bicarbonate powders to remove the fluoric acid compounds and the boric acid compounds in the flue gas. Preferably, in the acid removing process S120*a*, the first acid removing operation is performed before the second acid removing operation.

The second acid removing operation is implemented by using the sodium bicarbonate powders to remove the fluoric acid compounds and the boric acid compounds in the flue gas through a dry acid removal unit 21.

Fourth Embodiment

Figure 7:
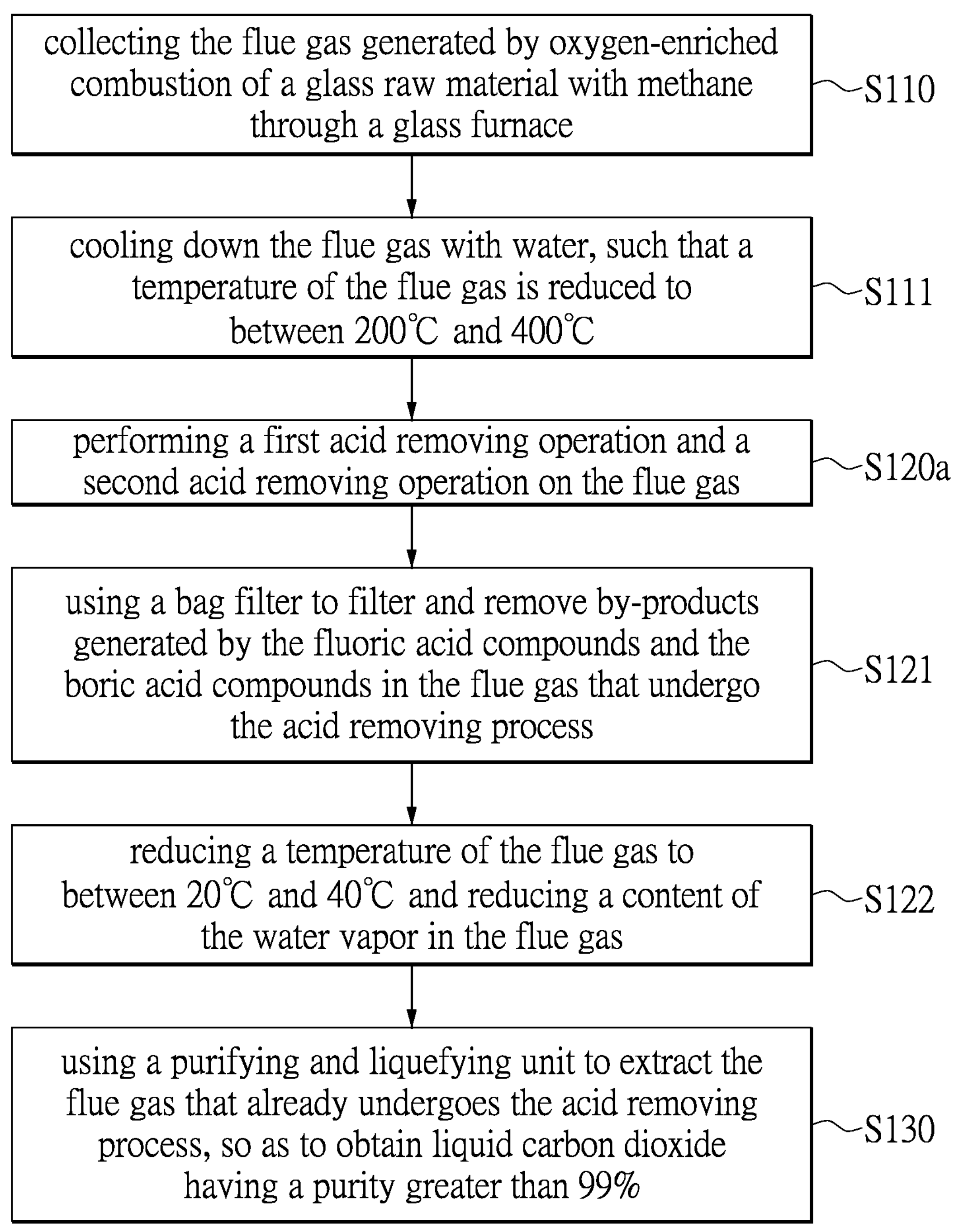
FIG. 7 is a flowchart of a method for extracting carbon dioxide from a flue gas according to a fourth embodiment of the present disclosure.
Figure 8:
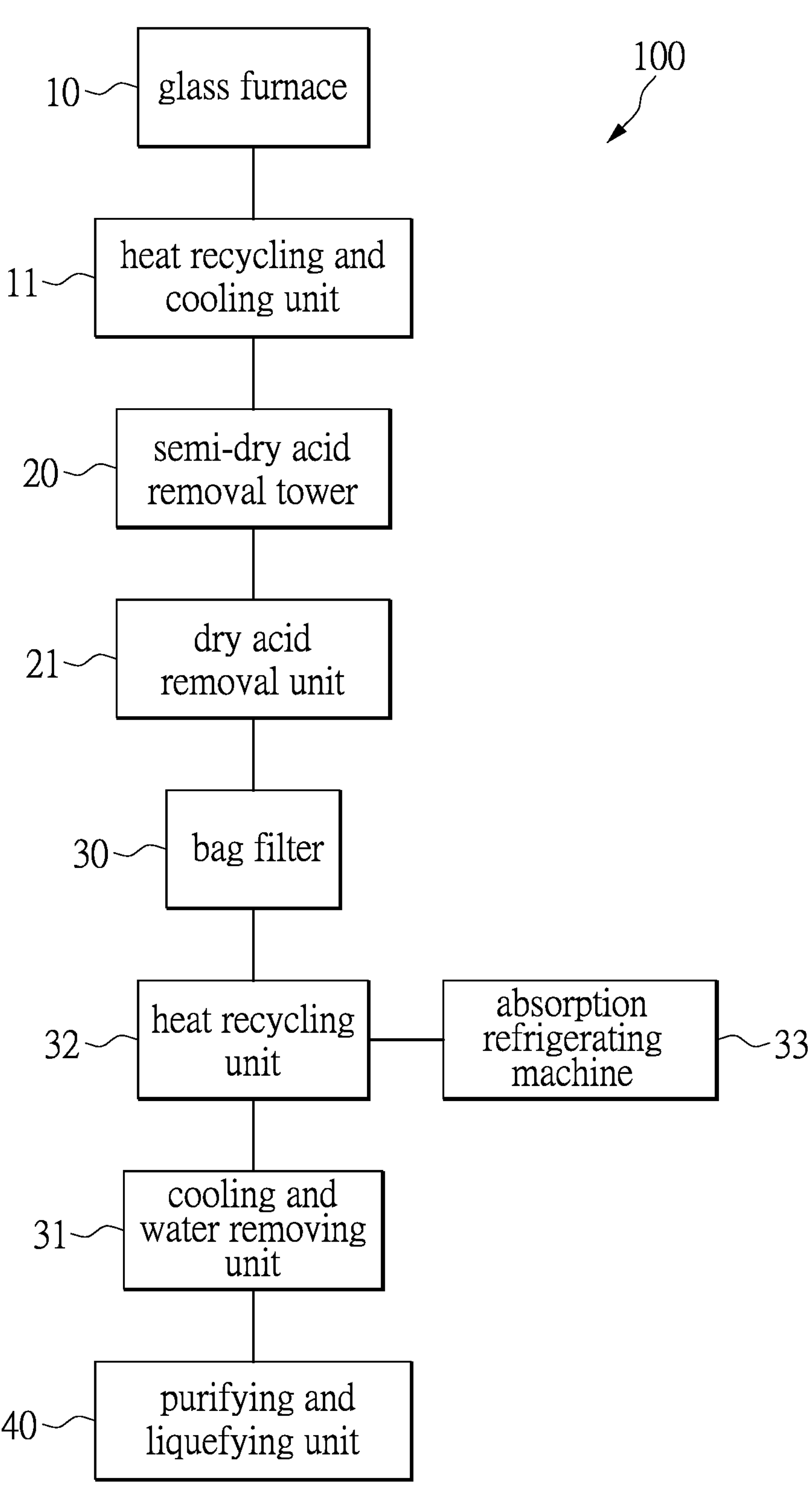
FIG. 8 is a schematic block diagram of a flue gas extracting system according to the fourth embodiment of the present disclosure.

Referring to FIG. 7 and FIG. 8, FIG. 7 is a flowchart of a method for extracting carbon dioxide from a flue gas according to a fourth embodiment of the present disclosure, and FIG. 8 is a schematic block diagram of a flue gas extracting system according to the fourth embodiment of the present disclosure. The present embodiment is similar to the above-mentioned third embodiment, so that the same parts of the two embodiments will not be reiterated herein, and the differences between the two embodiments are illustrated as follows.

Before the purifying and liquefying process S130 and after the removing process S121, the method further includes a cooling and water removing process S122, and the cooling and water removing process S122 is implemented by reducing a temperature of the flue gas to between 20° C. and 40° C. and reducing a content of the water vapor in the flue gas. Preferably, after the cooling and water removing process S122, the temperature of the flue gas is reduced to about 30° C.

In the cooling and water removing process S122 of the present embodiment, a cooling and water removing unit 31 can be used to reduce the temperature of the flue gas and reduce the content of the water vapor in the flue gas. In addition, before the flue gas enters into the cooling and water removing unit 31, the flue gas can be cooled down by a heat recycling unit 32. The heat recycling unit 32 can be connected to an absorption refrigerating machine 33, and the heat recycling unit 32 can cool down the flue gas with circulation water having a temperature within a range from 50° C. to 80° C.

After absorbing the heat of the flue gas, the circulation water becomes hot water or water vapor having a temperature within a range from 95° C. to 165° C. The absorption refrigerating machine 33 can cool down the above-mentioned hot water or water vapor, such that the hot water or the water vapor becomes low-temperature water. In the cooling and water removing process S122, the low-temperature water can be fed into the cooling and water removing unit 31 to cool down the flue gas. A temperature of the low-temperature water can be within a range from 4° C. to 7° C., but the present disclosure is not limited thereto. In addition, it is worth mentioning that, the hot water or the water vapor formed by the circulation water after absorbing the heat of the flue gas is not limited to being applied to the cooling and water removing unit 31. The heat of the hot water or the water vapor can be reused for heating other units (e.g., other units that are not included by the flue gas extracting system 100), thereby achieving a heat recycling and reusing effect.

After the cooling and water removing process S122, based on a volume of the flue gas being 100%, a content of the carbon dioxide is greater than or equal to 75%, and a content of the water vapor is less than or equal to 10%. Specifically, after the cooling and water removing process S122, based on the volume of the flue gas being 100%, the content of the carbon dioxide is within a range from 78% to 82%, a content of the nitrogen is within a range from 5% to 9%, the content of the water vapor is within a range from 2% to 6%, and a content of the oxygen is within a range from 7% to 11%.

Preferably, after the cooling and water removing process S122, based on the volume of the flue gas being 100%, the content of the carbon dioxide is within a range from 79% to 81%, the content of the nitrogen is within a range from 6% to 8%, the content of the water vapor is within a range from 3% to 5%, and the content of the oxygen is within a range from 8% to 10%. More preferably, after the cooling and water removing process S122, based on the volume of the flue gas being 100%, the content of the carbon dioxide is about 80%, the content of the nitrogen is about 7%, the content of the water vapor is about 4%, and the content of the oxygen is about 9%.

Experimental Results

The methods of the first embodiment to the fourth embodiment are compared with the method of a comparative embodiment, and each process in the first embodiment to the fourth embodiment and the comparative embodiment is listed as follows.

In addition, the flue gas before implementation of the acid removing process is defined as a first flue gas, and the flue gas before implementation of the purifying and liquefying process is defined as a second flue gas. Gas components of the first flue gas, volume ratios thereof, and the temperature of the first flue gas are listed in Table 2 as follows. Gas components of the second flue gas, volume ratios thereof, and the temperature of the second flue gas are listed in Table 3 as follows.

Table 1 shows each process of the first embodiment to the fourth embodiment and the comparative embodiment.

| Items | Comparative example | First embodiment | Second embodiment | Third embodiment | Fourth embodiment |
|---|---|---|---|---|---|
| Air combustion | yes | no | no | no | no |
| Oxygen-enriched combustion | no | yes | yes | yes | yes |
| Cooling process | no | no | yes | yes | yes |
| Acid removing | yes | yes | yes | yes | yes |

-continued

| Items | Comparative example | First embodiment | Second embodiment | Third embodiment | Fourth embodiment |
|---|---|---|---|---|---|
| process (first acid removing operation) | | | | | |
| Acid removing process (second acid removing operation) | no | no | no | yes | yes |
| Removing process | yes | yes | yes | yes | yes |
| Cooling and water removing process | no | no | no | no | yes |
| Purifying and liquefying process | no | yes | yes | yes | yes |

Table 2 shows the gas components of the first flue gas, the volume ratios thereof, and the temperature of the first flue gas in the first embodiment to the fourth embodiment and the comparative embodiment.

| Items | Comparative example | First embodiment | Second embodiment | Third embodiment | Fourth embodiment |
|---|---|---|---|---|---|
| Temperature (° C.) | 1,300 | 1,300 | 300 | 300 | 300 |
| Water vapor (volume %) | 20.1 | 59.0 | 59.0 | 59.0 | 59.0 |
| Carbon dioxide (volume %) | 11.5 | 33.7 | 33.7 | 33.7 | 33.7 |
| Oxygen (volume %) | 1.4 | 4.1 | 4.1 | 4.1 | 4.1 |
| Nitrogen (volume %) | 66.9 | 3.0 | 3.0 | 3.0 | 3.0 |
| Fluoric acid compounds ($mg/m^3$) | 117 | 350 | 350 | 350 | 350 |
| Boric acid compounds ($mg/m^3$) | 3.23 | 9.68 | 9.68 | 9.68 | 9.68 |

Table 3 shows the gas components of the second flue gas, the volume ratios thereof, and the temperature of the second flue gas in the first embodiment to the fourth embodiment and the comparative embodiment.

| Items | Comparative example | First embodiment | Second embodiment | Third embodiment | Fourth embodiment |
|---|---|---|---|---|---|
| Temperature (° C.) | 80 | 80 | 80 | 80 | 30 |
| Water vapor (volume %) | 30.6 | 71.6 | 71.6 | 71.6 | 4.2 |
| Carbon dioxide (volume %) | 9.9 | 24.6 | 24.6 | 24.6 | 82.8 |
| Oxygen (volume %) | 1.2 | 2.2 | 2.2 | 2.2 | 7.5 |

-continued

| Items | Comparative example | First embodiment | Second embodiment | Third embodiment | Fourth embodiment |
|---|---|---|---|---|---|
| Nitrogen (volume %) | 58.2 | 1.6 | 1.6 | 1.6 | 5.5 |
| Fluoric acid compounds (mg/m$^3$) | 0.3 | 0.6 | 0.6 | 0.1 | 0 |
| Boric acid compounds (mg/m$^3$) | 0 | 0 | 0 | 0 | 0 |

Discussion of Test Results

Since the glass raw material in the comparative embodiment is combusted through air-combustion, the volume ratios of carbon dioxide in the first flue gas and the second flue gas are lower than the volume ratios of carbon dioxide in the first flue gas and the second flue gas of the first embodiment.

Since the method of the second embodiment includes the cooling process, the temperature of the first flue gas is relatively lower.

Since the method of the third embodiment includes the first acid removing operation and the second acid removing operation, the content of the fluoric acid compounds in the second flue gas is relatively lower.

Since the method of the fourth embodiment includes the cooling and water removing process, the ratio of carbon dioxide in the second flue gas is relatively higher, and the content of the fluoric acid compounds in the second flue gas is relatively lower.

Beneficial Effects of the Embodiments

In conclusion, in the method provided by the present disclosure, by virtue of "collecting the flue gas generated by oxygen-enriched combustion of a glass raw material with methane from a glass furnace," and "using a sodium hydroxide aqueous solution to remove the fluoric acid compounds and the boric acid compounds in the flue gas," an issue of having difficulty to recycle and reuse the carbon dioxide due to a low volume ratio of the carbon dioxide in the flue gas after implementation of a conventional method for processing the flue gas can be effectively improved.

In addition, in the cooling and water removing process, the hot water or the water vapor formed by absorbing the heat of the flue gas can be fed into the absorption refrigerating machine, and form into the low-temperature water. The low-temperature water can be used to further cool down the flue gas, thereby achieving a heat recycling and reusing effect.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for extracting carbon dioxide from a flue gas, comprising:

a preparing process implemented by collecting the flue gas generated by oxygen-enriched combustion of a glass raw material with methane from a glass furnace, wherein the flue gas includes the carbon dioxide, nitrogen, water vapor, oxygen, fluoric acid compounds, and boric acid compounds;

an acid removing process implemented by performing a first acid removing operation on the flue gas, wherein the first acid removing operation is implemented by using a sodium hydroxide aqueous solution to remove the fluoric acid compounds and the boric acid compounds in the flue gas, wherein, in the acid removing process, a second acid removing operation is further performed on the flue gas, and the second acid removing operation is implemented by using sodium bicarbonate powders to remove the fluoric acid compounds and the boric acid compounds in the flue gas; and a purifying and liquefying process implemented by using a purifying and liquefying unit to extract the flue gas that already undergoes the acid removing process, so as to obtain liquid carbon dioxide having a purity greater than 99%.

2. The method according to claim 1, wherein, in the preparing process, a temperature of the flue gas is within a range from 1,000° C. to 1,500° C.; wherein, based on a volume of the flue gas being 100%, a content of the carbon dioxide is within a range from 30% to 34%, a content of the nitrogen is within a range from 1% to 5%, a content of the water vapor is within a range from 58% to 62%, and a content of the oxygen is within a range from 2% to 6%.

3. The method according to claim 1, wherein, in the preparing process, a content of the fluoric acid compounds is greater than 0 mg/m$^3$ and less than 500 mg/m$^3$, and a content of the boric acid compounds is greater than 0 mg/m$^3$ and less than 15 mg/m$^3$.

4. The method according to claim 1, wherein, after the preparing process and before the acid removing process, the method further includes a cooling process implemented by cooling the flue gas with water, such that a temperature of the flue gas is reduced to between 200° C. and 400° C.

5. The method according to claim 1, wherein, in the acid removing process, the first acid removing operation is implemented by using the sodium hydroxide aqueous solution to remove the fluoric acid compounds and the boric acid compounds in the flue gas through a semi-dry acid removal tower, and the second acid removing operation is implemented by using the sodium bicarbonate powders to remove the fluoric acid compounds and the boric acid compounds in the flue gas through a dry acid removal unit; wherein, after the first acid removing operation, a temperature of the flue gas is reduced to between 170° C. and 200° C., and after the second acid removing operation, the temperature of the flue gas is maintained between 170° C. and 200° C.

6. The method according to claim 5, wherein, based on a volume of the flue gas being 100%, a content of the carbon dioxide is within a range from 21% to 25%, a content of the nitrogen is within a range from 1% to 3%, a content of the water vapor is within a range from 70% to 74%, and a content of the oxygen is within a range from 1% to 3%.

7. The method according to claim 1, wherein, after the acid removing process and before the purifying and liquefying process, the method further includes a removing process, and the removing process is implemented by using a bag filter to filter and remove by-products generated by the fluoric acid compounds and the boric acid compounds in the flue gas that undergo the acid removing process.

8. The method according to claim 1, wherein, before the purifying and liquefying process, the method further includes a cooling and water removing process, and the cooling and water removing process is implemented by reducing a temperature of the flue gas to between 20° C. and 40° C. and reducing a content of the water vapor in the flue gas; wherein, after the cooling and water removing process, based on a volume of the flue gas being 100%, a content of the carbon dioxide is greater than or equal to 75%, and the content of the water vapor is less than or equal to 10%.

9. The method according to claim 8, wherein, in the cooling and water removing process, water having a temperature of from 50° C. to 80° C. is used to cool down the flue gas through a heat recycling unit; wherein, after the water absorbs heat of the flue gas, the water becomes hot water or water vapor having a temperature of from 95° C. to 165° C., the hot water or the water vapor is configured to be cooled down by an absorption refrigerating machine connected to the heat recycling unit and form into low-temperature water, and the low-temperature water is capable of reducing the temperature of the flue gas in the cooling and water removing process.

10. The method according to claim 8, wherein, after the cooling and water removing process, based on the volume of the flue gas being 100%, the content of the carbon dioxide is within a range from 78% to 82%, a content of the nitrogen is within a range from 5% to 9%, the content of the water vapor is within a range from 2% to 6%, and a content of the oxygen is within a range from 7% to 11%.

* * * * *